United States Patent
Nobusawa

[15] 3,678,825
[45] July 25, 1972

[54] AUTOMATIC EXPOSURE CONTROLS FOR CAMERAS

[72] Inventor: Tsukumo Nobusawa, Tokyo, Japan
[73] Assignee: Asahi Kogaku Kogyo Kabushiki Kaisha, Tokyo-to, Japan
[22] Filed: May 19, 1971
[21] Appl. No.: 144,869

Related U.S. Application Data

[63] Continuation-in-part of Ser. Nos. 11,405, Feb. 16, 1970, and Ser. No. 839,535, July 7, 1969.

[52] U.S. Cl. ..........................................95/10 CT, 95/53 EA
[51] Int. Cl. ..........................................G03b 7/08, G03b 9/62
[58] Field of Search..........................95/10 CE, 10 CT, 53 EA

[56] References Cited

UNITED STATES PATENTS

| | | | |
|---|---|---|---|
| 3,092,002 | 6/1963 | Frenk | 95/53 EA |
| 3,348,462 | 10/1967 | Fahlenberg | 95/53 EA |
| 3,526,181 | 9/1970 | Fahlenberg | 95/53 EA |
| 3,512,000 | 5/1970 | Powell | 95/10 CT |

Primary Examiner—Samuel S. Matthews
Assistant Examiner—Russell E. Adams, Jr.
Attorney—Harold D. Steinberg et al.

[57] ABSTRACT

A camera for determining automatically the exposure time during which a shutter of the camera remains open. The camera has external photosensitive units respectively receiving light which is external to the camera objective and which has passed through the camera objective into the interior of the camera. A differential circuit interconnects these photosensitive units for correcting the output of the external unit according to the light received by the internal unit. An oscillator circuit is connected to the external photosensitive unit to be operated thereby, and this oscillator circuit produces pulses with intervals therebetween. Each interval will be determined by the external photosensitive unit as corrected by the internal photosensitive unit and the differential circuit. A pair of electromagnets are provided for respectively opening and closing the camera shutter, and a control circuit is connected between the oscillator circuit and these electromagnets to bring about opening and closing of the shutter in response to one pulse and closing of the shutter in response to the next pulse of the oscillator circuit.

10 Claims, 1 Drawing Figure

PATENTED JUL 25 1972
3,678,825
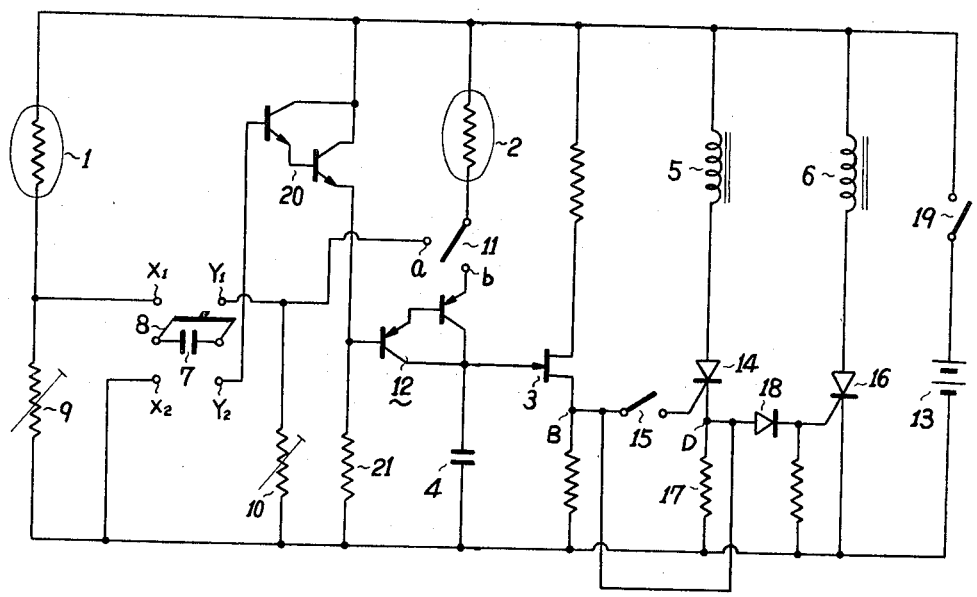
INVENTOR
TSUKUMO NOBUSAWA
BY Steinberg & Blake
ATTORNEY

AUTOMATIC EXPOSURE CONTROLS FOR CAMERAS

CROSS REFERENCE TO RELATED APPLICATION

This application is a continuation-in-part of copending application Ser. No. 11,405, filed Feb. 16, 1970 and copending application Ser. No. 839,535 filed July 7, 1969.

BACKGROUND OF THE INVENTION

The present invention relates to cameras.

In particular, the present invention relates to single-lens reflex cameras where light measured by a photosensitive structure is used to determine the exposure time through suitable circuitry.

With cameras of this type it is known that internal light which has passed through the objective into the interior of the camera can be measured by an internal photosensitive means situated in the path of the light which passes into and through the objective from the object which is to be photographed. Thus, before an exposure is made the light which passes through the objective of such cameras is directed to the viewfinder thereof, and a photosensitive means in the interior of the camera is situated in this path of light to respond to the intensity of the light received from the object.

With cameras of this latter type, when the exposure is made the mirror behind the objective is tilted upwardly from its position extending across the optical axis, so that the light passing through the objective is no longer received by the internal photosensitive means. As a result the circuitry required for such cameras must have the capability of storing the information received by the internal photosensitive means so that this stored information can then be used to determine the extent of film exposure. This requirement of providing the circuitry with the capability of storing this information renders the circuitry complex and expensive and represents a disadvantage of this type of structure.

On the other hand, there are known cameras which have external photosensitive means for receiving light which does not pass through the objective. For example light reaching the front of the camera from the object to be photographed can be received by such an external photosensitive means, and of course with such a construction the necessity of storing information prior to actual exposure is eliminated. However, because this type of photosensitive means receives external light there is an inaccuracy as between this external light and the light received internally in the camera, resulting from the fact that the light is influenced by the objective itself as well as from the fact that the angle of view of the external photosensitive means may be different from that of the objective, particularly where interchangeable objectives are provided for the camera.

Thus, each of the above types of arrangements has its own advantages and disadvantages.

A further disadvantage encountered with conventional structures of the above general type is that the circuitry which actuates the shutter in order to open and close the latter operates with an undesirable time lag, is undesirably complex, and is unusually sensitive to factors such as temperature, variations in the voltage received from the voltage source, and the like.

SUMMARY OF THE INVENTION

It is accordingly a primary object of the present invention to provide a camera which will avoid the above drawbacks.

In particular, it is an object of the present invention to provide a single lens reflex camera of the above general type which on the one hand will combine the best features of the internal and external photosensitive means and which on the other hand will actuate the shutter with a circuit which is characterized by great simplicity and lack of any time lag or sensitivity to factors such as variations in temperature and voltage supply.

Thus, it is an object of the invention to provide a camera with an automatic exposure control system which can be manufactured at low cost and which at the same time is highly reliable and operates with a high degree of accuracy under a variety of operating conditions.

According to the invention the camera includes an oscillator circuit means for generating pulses with intervals therebetween when the oscillator circuit means is in a state of oscillation. An external photosensitive means is electrically connected with the oscillator circuit means to place the latter in its state of oscillation. The camera also includes an internal photosensitive means and a differential circuit means connected between the internal and external photosensitive means for correcting the operation of the oscillator circuit means by the external photosensitive means in accordance with the light received by the internal photosensitive means. The camera also includes an electrical shutter-opening means and an electrical shutter-closing means, and a control circuit means is connected between the oscillator circuit means and the shutter-opening means and shutter-closing means for actuating the shutter-opening means to start an exposure in response to one of the pulses of the oscillator circuit means and for actuating the shutter-closing means to terminate the exposure in response to the next-following pulse of the oscillator circuit means. Inasmuch as the magnitude of the intervals between the pulses of the oscillator circuit means is determined by the light received by the external photosensitive means as corrected by the internal photosensitive means and the differential circuit means, the interval between opening and closing of the shutter will be controlled in a highly accurate manner for achieving accurate exposures with this structure.

BRIEF DESCRIPTION OF DRAWING

The invention is illustrated by way of example in the accompanying drawing which forms part of this application and in which there is illustrated one possible example of an electrical circuit providing the automatic exposure controls in accordance with the invention.

DESCRIPTION OF PREFERRED EMBODIMENTS

Referring now to the drawing, there is shown at the lower central part thereof a capacitor 4 which forms part of an oscillator circuit means. The capacitor means 4 serves to determine the exposure time in a manner described below. The exposure time, as determined by the capacitor 4, is in accordance with a signal transmitted to the capacitor 4 from an external photosensitive means 2 shown at the upper central part of the drawing. This external photosensitive means 2 is carried by the camera for receiving light which is external to the objective of the camera. Thus, for example, the front wall of the camera may be formed with an opening provided with a window through which light enters to be received by the photosensitive means 2 which is situated behind this window, and the window itself is situated beyond the objective of the camera. The photosensitive means 2 has a well known construction capable of converting the light which impinges on the photosensitive means 2 into a current the magnitude of which is determined by the light intensity. For example the photosensitive means 2 may be in the form of a photosensitive resistor which will permit more or less current to flow through the circuit in which the photosensitive means 2 is located depending upon the intensity of light received by the photosensitive means 2.

Because the photosensitive means 2 is situated beyond the path of light entering into the camera through the objective thereof, there will necessarily be a difference between the light received by the photosensitive means 2 and the light received by film which is exposed. Thus, there is an unavoidable loss of light resulting from the passage of light through the lenses of the objective, and this loss of light does not affect the operation of the photosensitive means 2 which receives light directly, this latter light passing perhaps only through the window in front of the photosensitive means 2. Also, the viewing angle of the particular objective which is on the camera may be different from the viewing angle of the photo-sensitive means 2. Where a camera is provided with only one objective which cannot be changed it is of course possible to design the structure carrying the photosensitive means 2 so that the latter will receive light from the same viewing angle as the objective. However, with single lens reflex cameras it is customary to provide interchangeable objectives, so that it is not possible to provide for the photosensitive means 2 a viewing angle which will correspond to that of the particular objective which the operator has selected to use with the camera. For all of these reasons there are unavoidable differences between the light received by the photosensitive means 2 and that which is received by the film during exposure thereof.

In order to correct these differences there is also provided an internal photosensitive means 1 which is indeed situated in a known manner in the interior of the camera to receive light which has passed through the objective thereof. This photosensitive means 1 may have the same construction as the photosensitive means 2 and it will be situated in the path of light reflected by the mirror of the camera up to the viewfinder. As is well known, just before exposure this mirror is tilted up beyond the optical axis so that the light passing through the objective can reach the film, and when the mirror is thus tilted to the position which will enable an exposure to be made the travel of light to the photosensitive means 1 will necessarily be interrupted. It is this latter condition which necessitates in conventional cameras provided only with internal photosensitive means the use of memory circuits for storing the information received by the internal photosensitive means so that the stored information can subsequently be used in the determination of the extent of exposure of the film. This drawback is avoided by the use of the external photosensitive means 2 which of course can continuously receive light at all times.

In order to correct the output of the photosensitive means 2 in accordance with a correction determined by the light received by the internal photosensitive means 1, a differential circuit means is provided between the photosensitive means 1 and the photosensitive means 2. This differential circuit means includes the capacitor 7 connected between the blades of a double-pole, double-throw switch 8 which forms a switch of the differential circuit means. In one position of the switch 8 it will connect the capacitor 7 between the external photosensitive means 2 and the internal photosensitive means 1 so as to be influenced by the difference between the light received by the external and internal photosensitive means, and the switch has a second position where this information is used to correct the output of the photosensitive means 2.

At the upper right portion of the drawing are shown the shutter-opening means 5 and the shutter-closing means 6. Both of these latter means are in the form of electromagnets. As is well known, single lens reflex cameras are conventionally provided with focal plane shutters. Such a shutter includes a leading curtain and a trailing curtain. Both of these curtains are moved to a position where the shutter is cocked ready to make an exposure. In this cocked position of the shutter springs conventionally act on the curtains to urge the latter back to their rest positions, and both curtains are conventionally held in their cocked positions in opposition to these springs by well known mechanisms which may include suitable hooks, for example, engaging projections for retaining the curtains in opposition to the springs in their cocked positions until the hooks are displaced away from the projections. Thus, the arrangement may be such that when the electromagnet 5 is energized the armature thereof will displace the hook of the leading curtain release assembly to a release position releasing the leading curtain for movement back to its rest position, and since the trailing curtain is still held at this time in its cocked position, the shutter opens and an exposure is made. Then when the electromagnet 6 is energized the hook or other releasable retainer controlled thereby is displaced to the release position releasing the trailing curtain so that it will be driven by the spring operating thereon back to the rest position closing the shutter and terminating the exposure. Thus, energizing electromagnet 5 of the shutter-opening means will start an exposure and energizing of the electromagnet 6 of the shutter-closing means will terminate the exposure, so that the interval between energizing of the electromagnet 5 and energizing of the electromagnet 6 will determine the exposure time.

This interval between energizing of the electromagnet 5 to start an exposure and energizing of the electromagnet 6 to terminate an exposure is determined by the oscillator circuit means which includes the capacitor 4, as pointed out above. In addition the oscillator circuit means includes the unijunction transistor 3. The capacitor 4 is connected between the control electrodes of the unijunction transistor 3, and the oscillation circuit means formed by these components will generate pulses with intervals therebetween in response to charging and discharging of the capacitor 4. For this purpose the oscillator circuit means may be a circuit whose pulse corresponds to the output of a non-stable multivibrator utilizing the capacitor 4.

As was indicated above, the capacitor 7 forms part of the differential circuit means which together with the internal photosensitive means 1 so as to correct the output of the external capacitor means 2. The switch 8 of the differential circuit means has its switch blades connected to the terminals of the capacitor means 7. The switch 8 includes a contact $X_1$ which is electrically connected to a junction between the internal photosensitive means 1 and a resistor 9 which is in series with the internal photosensitive means 1. Also the switch has a contact $Y_1$ connected to a junction between the external photosensitive means 2 and a resistor 10. The circuit also includes a switch 11 for connecting the photosensitive means 2 to the resistor 10 when the blade of the switch 11 engages the contact $a$ and for connecting the photosensitive means 2 to the capacitor 4 through a transistor current control circuit 12 when the blade of the switch 11 engages the contact $b$, the transistor current control circuit 12 and the capacitor 4 being connected in series. Thus it will be noted that when the switch 11 engages the contact $a$ and the switch 8 is in the position connecting the capacitor 7 between the contacts $X_1$ and $Y_1$, the capacitor 7 is connected directly between the external photosensitive means 2 and the internal photosensitive means 1.

The base of the transistor current control circuit 12 is connected to a junction between a high input impedance transistor circuit 20 and a fixed resistor 21. The switch 8 can be displaced from the position where its blades engage the contacts $X_1$ and $Y_1$ to the position where its blades engage the contacts $X_2$ and $Y_2$, and in this latter position of the switch 8 the differential circuit means will serve to connect the capacitor 7 in series between the base electrode terminal $Y_2$ of the transistor circuit 20 and the negative side terminal $X_2$ of the voltage source provided by the battery 13 which serves to operate the circuits.

An electrical control means is provided for connecting the oscillator circuit means 3, 4 to the shutter-opening means 5 and the shutter-closing means 6 so as to control the operation of the latter two means in accordance with pulses received from the oscillator circuit means 3, 4. This control means includes a pair of silicon control elements 14 and 16 respectively connected electrically to the electromagnets 5 and 6. A switch 15 is provided for connecting the oscillator circuit means to the control means which includes the silicon control elements 14 and 16. This control means also includes the diode 18 which is connected between the elements 14 and 16. The switch 15 is closed when the shutter-operating button of the camera is depressed to trip the shutter and release the latter for making an exposure. This switch 15 is connected to the output terminal B of the unijunction transistor 3. The silicon control element 16 which controls energizing of the electromagnet 6 is connected through the diode 18 to the junction D between the silicon control element 14 and the resistor 17 which is connected in series with the cathode of the silicon control element 14 in order to establish a bias. The switch 19 serves to close the entire circuit illustrated in the drawing in preparation for making an exposure.

When an exposure is to be made, the switch 19 will be closed in a known manner and the switch 8 is in its normal rest position where the blades thereof engage the switch contacts $X_1$ and $Y_1$, while the switch 11 is in its normal rest position where it engages the contact $a$. Thus, upon closing of the switch 19 with the object which is to be photographed viewed through the viewfinder of the camera, light impinging on the internal photosensitive means 1 and the external photosensitive means 2 will apply a voltage across the terminals of the capacitor 7 in accordance with the different resistance values resulting at the internal photosensitive means 1 and external photosensitive means 2 from the light impinging thereon. Thus, the capacitor 7 is charged in accordance with a voltage corresponding to the difference between the voltage at the terminal or contact $X_1$ as determined by the photosensitive means 1 and the voltage at the terminal or contact $Y_1$ as determined by the photosensitive means 2. In general the amount of light received by the photosensitive means 1 will be less than that received by the photosensitive means 2 because the light received by the photosensitive means 1 has first passed through the objective and because the viewing angles of the objective and the photosensitive means 2 may be different, and additional optical requirements peculiar to the particular objective which is used will in general result in a voltage at the terminal $X_1$ which is somewhat less than the voltage at the terminal $Y_1$.

As is well known, when the shutter-tripping button or plunger of the camera is depressed it will be required to move through a predetermined distance. When this plunger has been depressed by the operator through approximately one half this distance, the switch 8 will in a known way be moved away from the contacts $X_1$ and $Y_1$ and into engagement with contacts $X_2$ and $Y_2$, and then a slightly additional depression of the shutter-operating plunger will move the switch 11 away from the contact $a$ into engagement with the contact $b$. Thus, the current as determined by the external photosensitive means 2, the high input impedance transistor circuit 20, and the transistor current control circuit 12 will now flow to the timing capacitor 4 of the oscillator circuit means. In other words, the current determined by the external photosensitive means 2 in accordance with the intensity of external light received thereby is corrected based upon the difference between the light intensity received by the internal photosensitive means 1 and the external photosensitive means 2, this difference being stored by the capacitor 7 in the form of a charge which has been accumulated thereby, and with this circuit the charge will build at the capacitor 4 as time passes.

When the terminal voltage of the capacitor 4 achieves a predetermined value, the unijunction transistor 3 will change over from its non-conductive to its conductive state, and now the charge which has accumulated at the capacitor 4 is discharged through the transistor 3. This discharge will return the unijunction transistor 3 back to its non-conductive state, and the charging of the capacitor 4 will now start again. When the terminal voltage of the capacitor 4 again reaches the predetermined value, the unijunction transistor 3 will again be brought into its conductive state, and the charge accumulated on the capacitor 4 will again be discharged through the transistor 3, again rendering the latter non-conductive and again starting the charging of the capacitor 4. In this way the oscillator circuit means 3, 4 generates pulses at intervals determined by the period required for the capacitor 4 to be charged to the value which will change the unijunction transistor 3 from its non-conductive to its conductive state. This interval required for charging of the capacitor 4 is determined by the intensity of the light received by the photosensitive means 2 as corrected by the internal photosensitive means 1 and the differential circuit means. Thus, the oscillator circuit means is placed in a state of oscillation generating pulses with intervals therebetween, and the magnitude of each interval is determined by the lighting conditions, so that the interval between the pulses generated by the oscillator circuit means forms an accurate exposure-time determining factor.

The continued depression of the shutter-releasing plunger of the camera beyond the point where the switch 11 has been displaced into engagement with the contact $b$ will result in a known way in tilting of the mirror upwardly beyond the optical axis to a position permitting the film to be exposed, and the movement of the plunger to its end position at the end of its path of travel will result in closing of the switch 15, immediately after tilting of the mirror to the upward position away from the optical axis, so that now the control means 14–18 is connected into this circuit to receive the pulses from the oscillator circuit means. The first pulse which is generated by the oscillator circuit means at the output terminal B immediately subsequent to closing of the switch 15 will be transmitted to the silicon control element 14 so that this silicon control element is rendered conductive. The changing over of the silicon control element 14 from its non-conductive to its conductive state by this first pulse will result in closing of the circuit portion which includes the electromagnet 5 so that the latter becomes energized. In other words the silicon control element 14 acts as a switch and when the silicon control element assumes its conductive state an operation equivalent to closing of a switch in the circuit of electromagnet 5 takes place. This energizing of the electromagnet 5 will result in release of the cocked leading curtain of the shutter, so that the exposure is started by this first pulse, in the manner described above.

At the instant when the silicon control element 14 is rendered conductive by this first pulse, the silicon control element 16 is still in its non-conductive state. The control electrode of the silicon control element 16 is connected to the output terminal B of the oscillating circuit means through the diode 18 and the silicon control element 16 remains in its non-conductive state when this first pulse is transmitted to the silicon control element 14 due to the lower bias voltage at the junction D under the control of the silicon control element 14 which is still in its non-conductive state before the first pulse after closing of the switch 15 is transmitted to the control means. Thus, the silicon control element 16 is not rendered conductive by this first pulse.

Thus, the shutter has been opened and an exposure has started in response to transmission of a pulse from the oscillator circuit means to the silicon control element 14 immediately subsequent to closing of the switch 15. After the interval required for generation of the next pulse, as determined by the light at the object which is to be photographed, as pointed out above, this next or second pulse is generated at the output terminal B. At this instant the diode 18 will have already assumed its conductive state due to the rise of the bias voltage at the node or junction D, so that now this second pulse will be transmitted and received by the silicon control element 16 at the control electrode thereof, thus rendering the silicon control element 16 conductive and thus closing the circuit in which the electromagnet 6 is located. Therefore the electromagnet 6 will be energized in response to this next pulse, releasing the trailing curtain so that the shutter closes and the exposure is terminated.

Of course, upon release of the shutter-operating plunger for return to its rest position and after completion of the above operations the switch 19 will again open, the switch 8 will return to the position closing the circuit between the contacts $X_1$ and $Y_1$, the switch 11 will return into engagement with the contact $a$, and the switch 15 will assume its normally open position.

It is thus apparent that with the above-described structure of the invention the advantages peculiar to the use of both inner and outer photosensitive means are retained in conjunction with the advantages of using a shutter-control mechanism where opening and closing of the shutter is brought about by a pair of electromagnets so that without any undesirable time lag the exposure time can be automatically determined with a high degree of precision and with a relatively simple inexpensive structure which operates very reliably.

With the present invention the light received by the external photosensitive means 2 is compared with the light received by the internal photosensitive means 1, and the information based upon the differential therebetween is temporarily stored as an electrical charge accumulated by the capacitor 7, and this is the information which is used to correct the output of the external photosensitive means 2, so that this correction information is effectively added to the timing operation as determined by the light received by the external photosensitive means 2. It will be noted that this determination of the signal which is transmitted to the oscillator circuit means is independent of shutter operation. The timing is brought about with an exceedingly simple mechanism comparable with conventional simple mechanisms utilizing only external photosensitive means, and any time lag in the operation is offset by bringing about opening and closing of the shutter through the use of electromagnets 5 and 6 of common operating characteristics, with the interval between the pulse signals being determined by the precise information of the lighting conditions at the object which is to be photographed. Thus with the invention an excellent control of exposure time is achieved in a fully automatic manner with a high degree of precision and with a simplified structure which is not influenced to any appreciable degree by variations in ambient temperature or variations in the voltage supplied from the battery 13.

What is claimed is:

1. In a camera, oscillator circuit means for generating pulse with intervals therebetween when said circuit means is in a state of oscillation, external photosensitive means for receiving the light external to an objective of the camera, said external photosensitive means being electrically connected to said oscillator circuit means for placing the latter in said state of oscillation, internal photosensitive means for receiving light which has passed through the objective of the camera into the interior thereof, differential circuit means electrically connected between said internal and external photosensitive means for correcting the output of said external photosensitive means according to the difference between the light received by said internal and external photosensitive means, so that the state of oscillation of said oscillator circuit means is determined according to the output of said external photosensitive means as corrected by the light received by said internal photosensitive means, electrical shutter-opening means for opening a shutter of the camera to start an exposure, electrical shutter-closing means for closing the shutter of the camera to terminate the exposure, and electrical control means electrically connecting said oscillator circuit means to said shutter-opening means and said shutter-closing means for actuating said shutter-opening means to start an exposure in response to one of said pulses of said oscillator circuit means and for actuating said shutter-closing means to terminate the exposure in response to the next pulse of said oscillator circuit means which follows said one pulse thereof.

2. The combination of claim 1 and wherein said shutter-opening means and said shutter-closing means respectively include a pair of electromagnets.

3. The combination of claim 1 and wherein said control means includes a pair of silicon control elements electrically connected to said shutter-opening means and said shutter-closing means, respectively, and initially being in a non-conductive state, and a switch for connecting said oscillator circuit means to the silicon control element connected to said shutter-opening means for rendering the latter silicon control element conductive in response to said one pulse, said control means including a diode connected between said silicon control elements for rendering the silicon control element connected to said shutter-closing means conductive only in response to said next pulse.

4. The combination of claim 1 and wherein said oscillator circuit means includes a capacitor electrically connected to said external photosensitive means to be charged thereby, and a unijunction transistor electrically connected to said capacitor to be rendered conductive when said capacitor has been charged to a predetermined extent, so that said capacitor then discharges through said transistor to provide a pulse whereupon said transistor again becomes non-conductive and said capacitor is again charged to bring about the next pulse after a given interval, whereby according to the period required for charging of the capacitor to render said transistor conductive, as determined by the intensity of light received by said external photosensitive means, the pulses will be generated at intervals which determine the exposure time.

5. The combination of claim 4 and wherein a transistor current control circuit is connected between said external photosensitive means and said capacitor in series therewith.

6. The combination of claim 1 and wherein said differential circuit means includes a capacitor and a switch having one position connecting said capacitor between said internal and external photosensitive means and another position connecting said capacitor to said oscillator circuit means.

7. The combination of claim 6 and wherein a high input impedance transistor circuit is connected between said capacitor of said differential circuit means and said oscillator circuit means when said switch is in said other position thereof.

8. The combination of claim 7 and wherein a transistor current control circuit is connected between said high input impedance transistor circuit and said oscillator circuit means as well as between said oscillator circuit means and said external photosensitive means.

9. The combination of claim 1 and wherein said shutter-opening means and said shutter-closing means respectively include a pair of electromagnets, said control means including a pair of silicon control elements respectively connected to said electromagnets for actuating the latter when said silicon control elements respectively are rendered conductive, a switch for connecting said oscillator circuit means to the silicon control element connected to the electromagnet of said shutter-opening means for rendering the latter silicon control element conductive in response to said one pulse, and said control means including a diode connected between said silicon control elements for rendering the silicon control element connected to said shutter-closing means conductive only in response to said next pulse, whereby the interval between said pulses determines the interval between actuation of said shutter-opening means and said shutter-closing means.

10. The combination of claim 9 and wherein said oscillator circuit means includes a unijunction transistor having an output connected through said switch to said silicon control element which is connected to said shutter-opening means for transmitting said one pulse to the latter silicon control element, said oscillator circuit means also including a capacitor operatively connected to said unijunction transistor and to said external photosensitive means for providing with said unijunction transistor said pulses with an interval therebetween determined by the intensity of light received by said external photosensitive means as corrected by the intensity of light received by said internal photosensitive means and said differential circuit means.

* * * * *